Nov. 3, 1953          S. L. WIIG          2,657,779
AUTOMATIC GEAR SHIFTING MECHANISM
Filed March 10, 1952          5 Sheets—Sheet 1
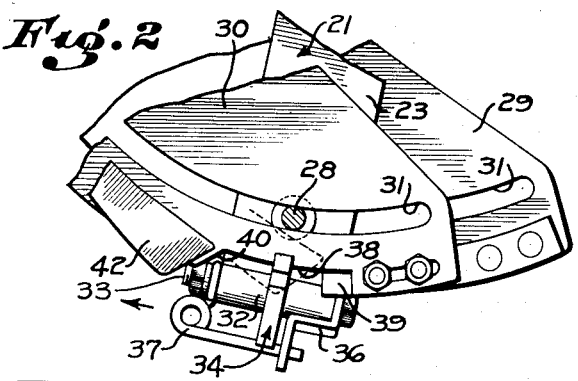
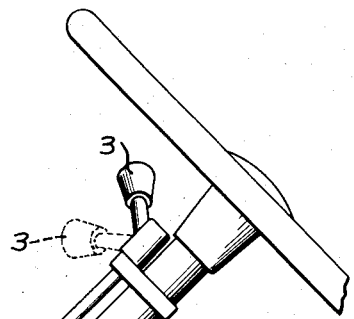
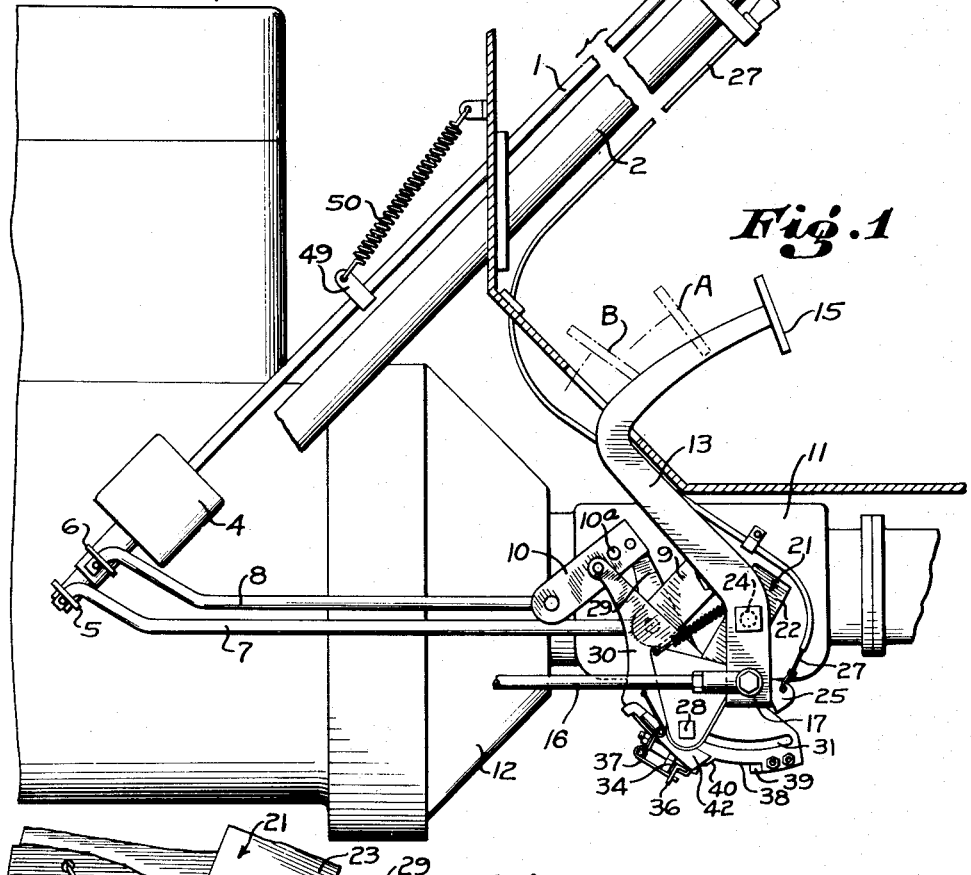
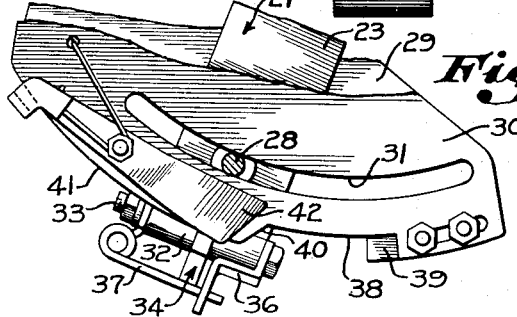
INVENTOR.
SELMER L. WIIG
BY
Lyon & Lyon
ATTORNEYS Nov. 3, 1953  S. L. WIIG  2,657,779
AUTOMATIC GEAR SHIFTING MECHANISM
Filed March 10, 1952  5 Sheets-Sheet 2
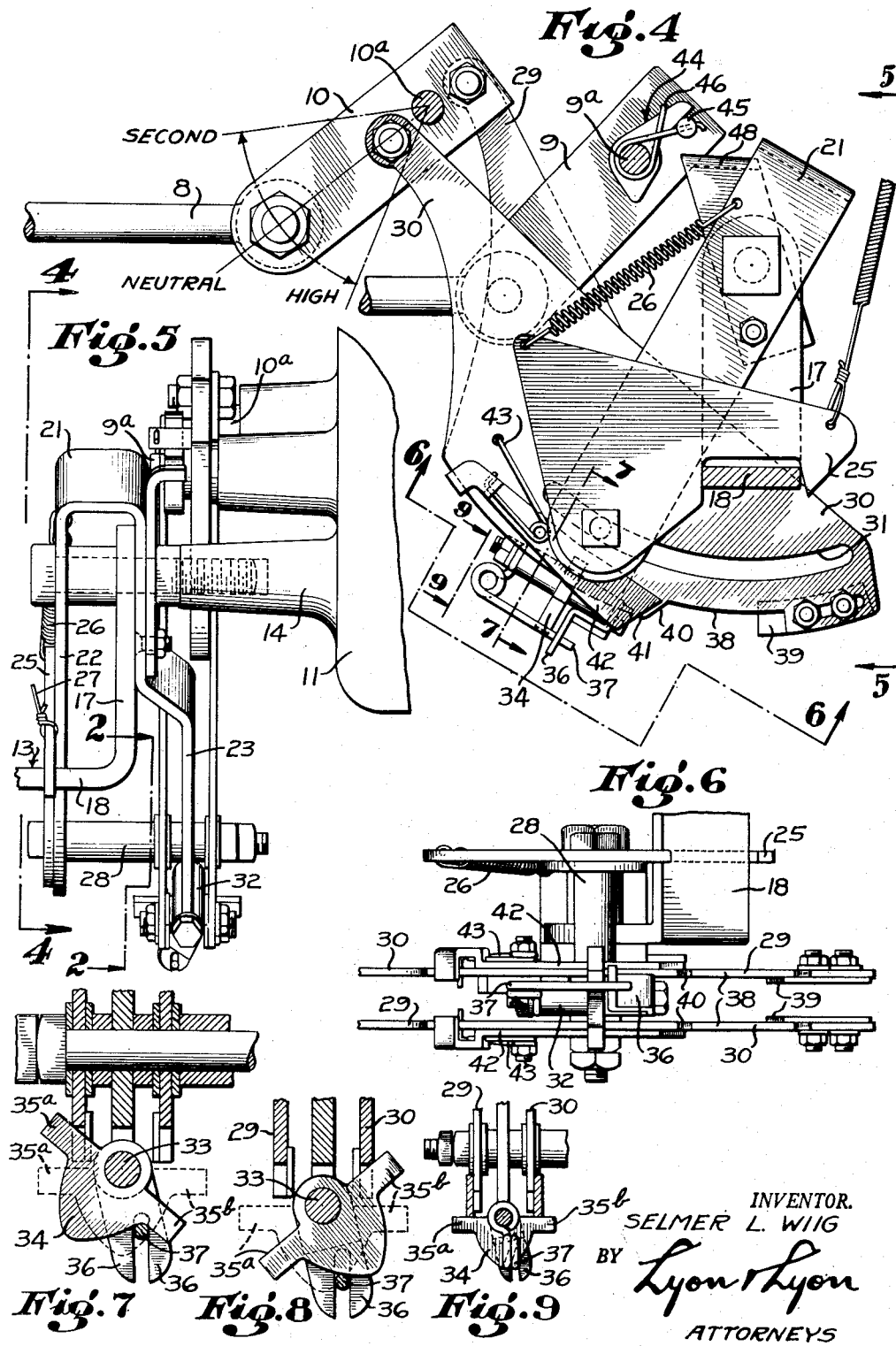
INVENTOR.
SELMER L. WIIG
BY Lyon & Lyon
ATTORNEYS

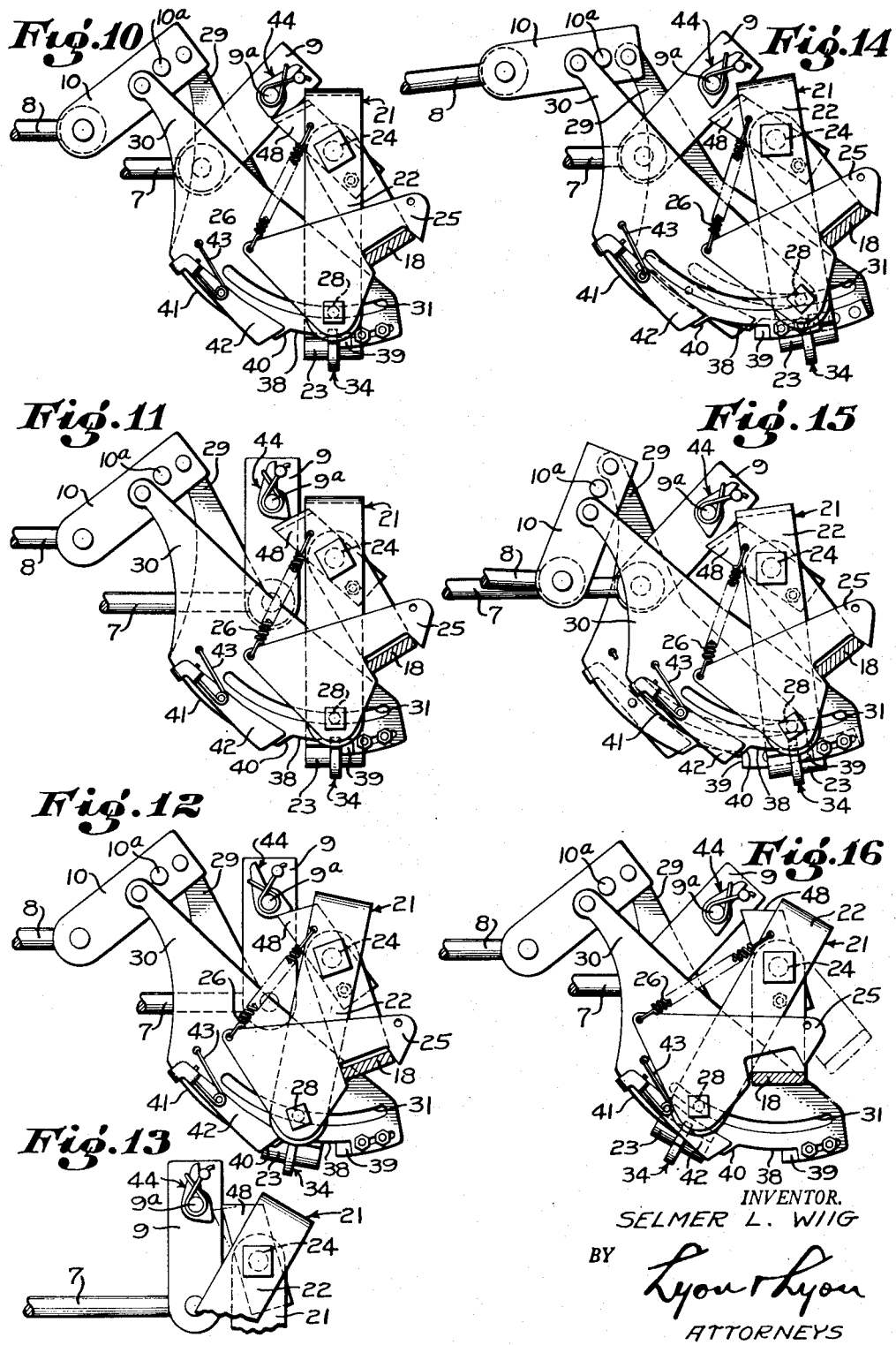

Nov. 3, 1953
S. L. WIIG
2,657,779
AUTOMATIC GEAR SHIFTING MECHANISM
Filed March 10, 1952
5 Sheets-Sheet 4
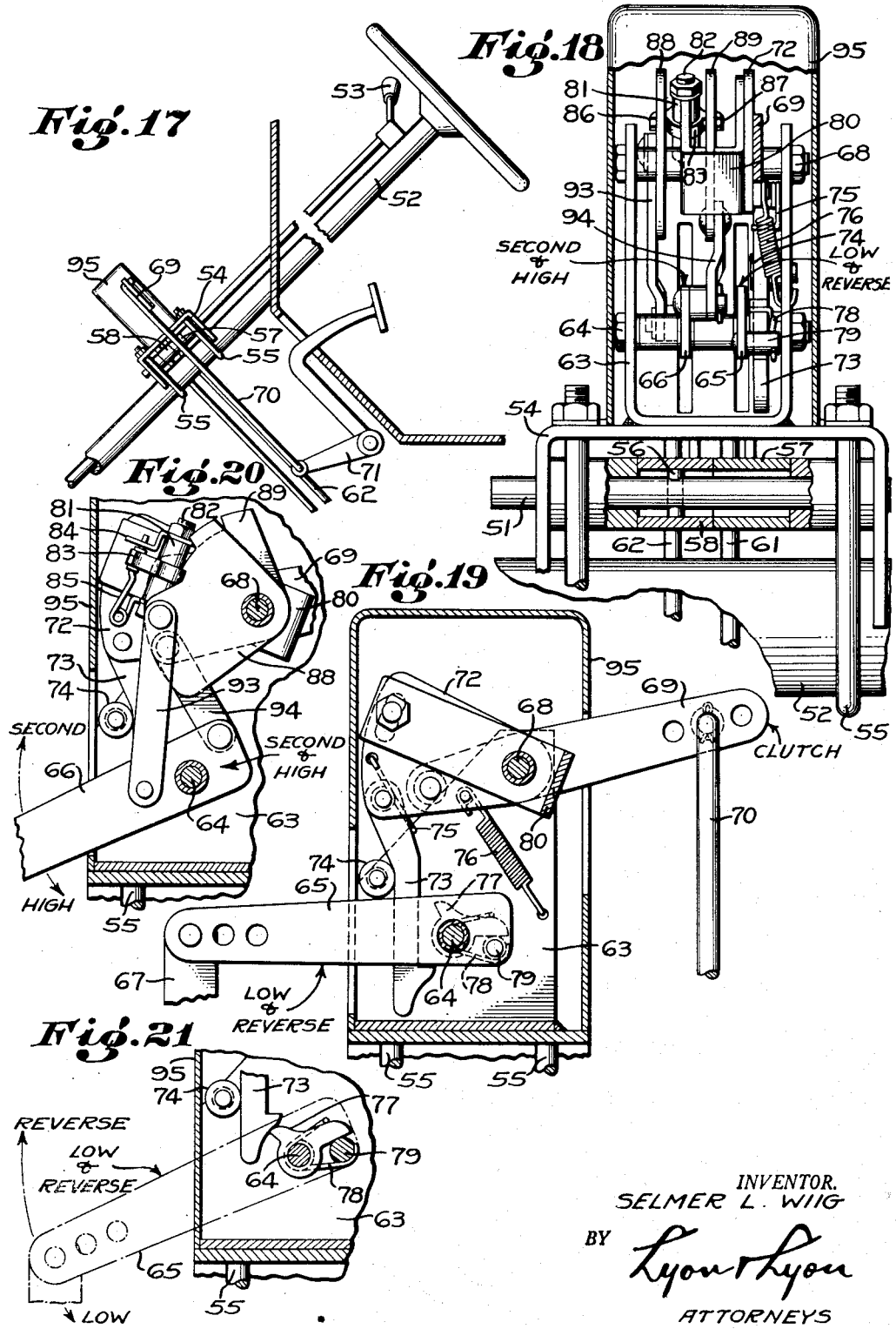
INVENTOR.
SELMER L. WIIG
BY Lyon & Lyon
ATTORNEYS

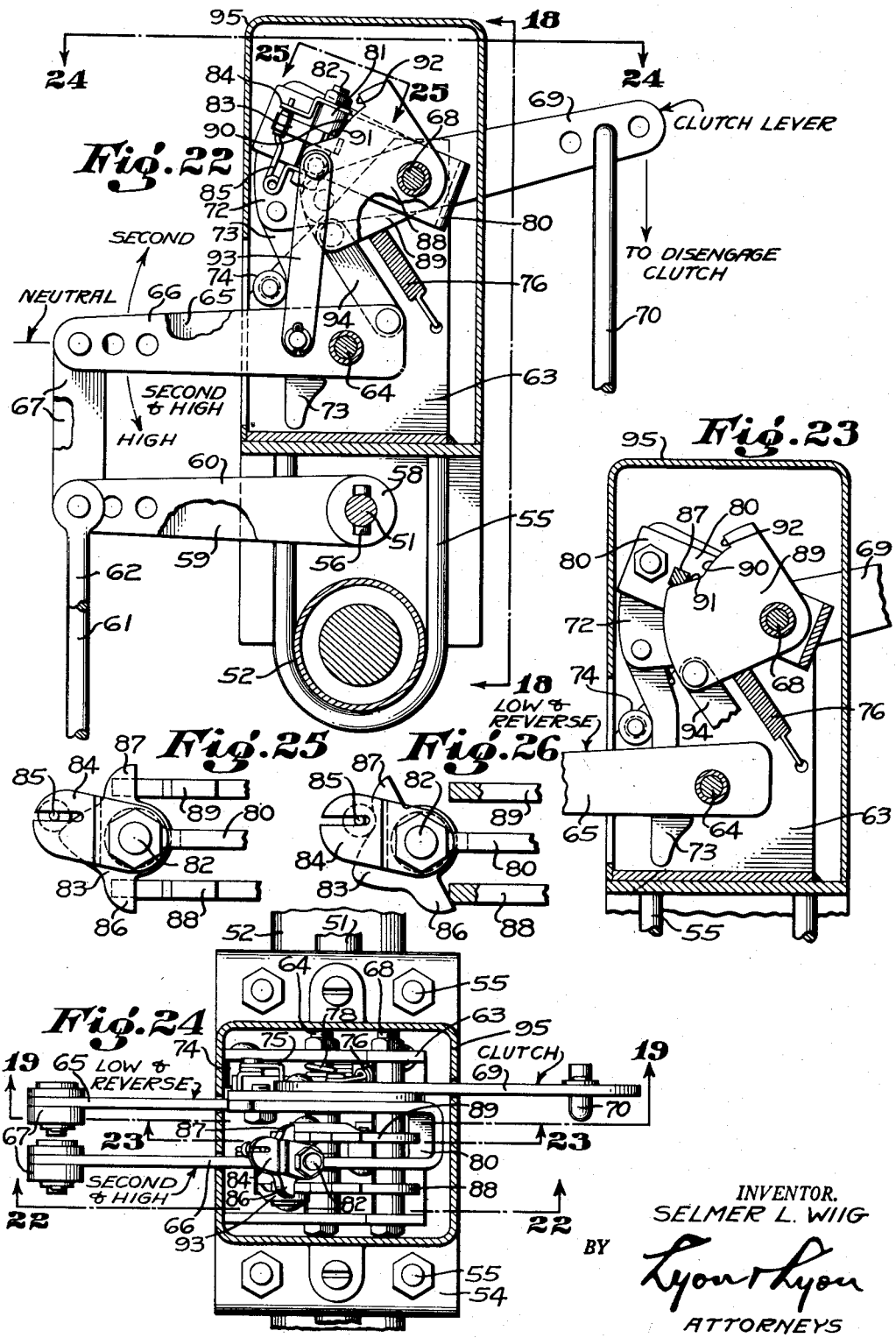

Patented Nov. 3, 1953

2,657,779

UNITED STATES PATENT OFFICE 2,657,779

AUTOMATIC GEAR SHIFTING MECHANISM

Selmer L. Wiig, Los Angeles, Calif., assignor to
B. J. Audette

Application March 10, 1952, Serial No. 275,709

13 Claims. (Cl. 192—3.5)

My invention relates to automatic gear shifting mechanisms, more particularly to gear shifting mechanisms for incorporation with a manually operated, steering column mounted, gear shifting means conventionally employed in automotive vehicles.

Included in the objects of my invention are:

First, to provide an automatic gear shifting mechanism which is so arranged that after setting the transmission gears manually in "low," the gears may be shifted automatically with each operation of the clutch pedal to advance the speed of the car through "second" and "high" gears.

Second, to provide a mechanism of this class wherein the gears may be alternately shifted between second and high speeds, merely by operation of the clutch pedal.

Third, to provide a mechanism of this class wherein by partial depression of the clutch pedal, but with complete disengagement of the clutch, progressive shifting from low to high or alternate shifting between second and high may be prevented, and the transmission automatically moved to second.

Fourth, to provide a mechanism of this class which may be readily rendered inoperative, if desired, so that the gears may be shifted manually in the conventional manner, the automatic mechanism in no manner interfering with such manual operation.

Fifth, to provide a mechanism of this class which is particularly simple of manufacture and installation and which may be adapted to all makes and models of manual shifting devices.

With the above and other objects in view as may appear hereinafter, reference is directed to the accompanying drawings in which:

Figure 1 is a fragmentary sectional view of a typical vehicle having a steering column mounted, manual shifting means showing my automatic gear shifting mechanism incorporated therewith.

Figure 2 is an enlarged fragmentary sectional view through 2—2 of Figure 5, showing the second-high speed shifting mechanism, the parts being shown in the position assumed when the transmission is in second gear, with the clutch partially engaged.

Figure 3 is a similar fragmentary sectional view showing the parts when the second-high gears are in neutral and the clutch is almost fully engaged.

Figure 4 is a fragmentary sectional view taken through 4—4 of Figure 5, showing the mechanism more completely than in Figures 2 and 3 with the parts in the position assumed when the low-reverse gears and the second-high gears are in neutral and the clutch is engaged.

Figure 5 is an enlarged fragmentary elevational view taken substantially along the line 5—5 of Figure 4.

Figure 6 is a bottom view thereof, taken substantially along the line 6—6 of Figure 4.

Figure 7 is a fragmentary sectional view through 7—7 of Figure 4, showing the second-high speed shifting rocker or toggle in position for effecting movement to second gear.

Figure 8 is a similar fragmentary sectional view, showing the rocker or toggle in a position for effecting shifting of the transmission into high gear.

Figure 9 is a fragmentary sectional view through 9—9 of Figure 4, showing the rocker or toggle in its intermediate position.

Figures 10 to 16 inclusive, are reduced views taken in the same plane as Figure 4 and showing the parts in the various positions assumed for different gear speeds of the transmission. More specifically:

Figure 10 shows the low-reverse shifting lever in neutral, the second-high shifting lever in neutral position and the clutch disengaged by the clutch pedal in an intermediate position.

Figure 11 differs from Figure 10 in that the low-reverse shifting lever is in low position.

Figure 12 differs from Figure 11 in that the clutch has moved toward its engaged position.

Figure 13 differs from Figure 12 in that the clutch is in its fully engaged position, in which case, the vehicle is operating in low gear.

Figure 14 shows the low-reverse shifting lever in neutral position, the second-high shifting lever in second position and the clutch fully disengaged.

Figure 15 differs from Figure 14 in that the second-high gear shifting lever is shown in high gear.

Figure 16 is similar to Figure 4 except that the hook which normally connects the automatic gear shifting mechanism with the clutch operating lever is disengaged therefrom to permit full manual operation of the gear shifting lever.

Figure 17 is a fragmentary sectional view similar to Figure 1 showing a typical vehicle steering column and manual shifting means with a modified form of my automatic gear shifting mechanism connected therewith.

Figure 18 is a partial sectional partial elevational view of the modified gear shifting mechanism taken along the line 18—18 of Figure 22 with a portion of the housing or cover broken away.

Figure 19 is a sectional view thereof through 19—19 of Figure 24 showing particularly the manner in which the low-reverse lever is connected with the clutch operated rod.

Figure 20 is a fragmentary sectional view similar to Figure 22 showing the second-high lever in "high" position.

Figure 21 is a fragmentary sectional view similar to Figure 19 showing the low-reverse in "low" position.

Figure 22 is a sectional view through 22—22 of Figure 24 showing particularly the mechanism associated with the second-high lever.

Figure 23 is a sectional view through 23—23 of Figure 24 taken in a plane intermediate sections 19—19 and 22—22.

Figure 24 is a partial sectional partial plan view taken through 24—24 of Figure 22.

Figure 25 is a fragmentary elevational view taken through 25—25 of Figure 22, showing the rocker cam in its intermediate position.

Figure 26 is a similar view with the rocker cam in its normal or second-gear operating position.

Reference is first directed to Figures 1 through 16.

My automatic gear shifting mechanism is intended for use with the conventional manual shifting apparatus as now employed in automotive vehicles. Such apparatus involves a control rod 1 mounted on the steering column 2 of a vehicle and provided with a hand lever 3 arranged to move the control rod longitudinally and to rotate the control rod a limited amount.

The control rod extends into a transfer box 4 adjacent the lower end of the steering column. Within the transfer box, there is provided a mechanism (not shown) for effecting arcuate movement of a low-reverse lever 5 and a second-high lever 6. The arrangement is such that in one arcuate position of the control rod, the low-reverse lever is moved by the control rod whereas in the other arcuate position thereof, the second-high lever is operated.

In the conventional manual gear shifting device, the levers 5 and 6 are connected by rods 7 and 8 to other levers which are attached respectively to a low-reverse shifting shaft 9a and a second-high shifting shaft 10a. In the exercise of my invention, I substitute levers 9 and 10 for the conventional shifting shaft levers.

Insofar as manual operation of the transmission gear shifting shafts are concerned, my special or substituted operating levers 9 and 10 function in the manner of the conventional levers. The gear shifting shafts project through suitable journal bosses into the transmission case 11.

The conventional vehicle with manual means for shifting the transmission gears, is provided with a clutch (not shown) mounted in a housing 12 disposed forwardly of the transmission case. A clutch lever 13 is suitably supported for arcuate movement. In the illustration, the clutch lever is shown as supported from a boss 14 extending laterally from the transmission case. The clutch lever includes an arm having arcuate extremity projected into the driver's compartment and provided with a pedal 15. A connecting rod 16 joins the clutch lever to the clutch mechanism contained in the housing 12. In the present construction, a conventional clutch lever is shown which has a U-shaped extremity 17, providing a cross portion 18 in the opposite side of its fulcrum from the clutch pedal 15.

The structure so far described, except for the substitution of the special operating levers 9 and 10, is conventional and may of course vary with the various makes and models of vehicles, and while my mechanism is shown in conjunction with one type of conventional gear shifting device, my mechanism may be adapted by changing proportions and arrangement for connection to other types of manual gear shifting devices.

My automatic gear shifting mechanism includes a drive member in the form of an inverted U-shaped strap 21, forming downwardly directed lever arms 22 and 23. The drive member is fulcrumed on a shaft 24 which may constitute a modification of or substitute for the conventional clutch lever fulcrum shaft. One of the depending lever arms 22 extends alongside the U-shaped extremity 17 of the clutch lever. Pivotally attached to the arm 22 is a latch member 25 adapted to hook over the cross portion 18 of the clutch lever 13 so as to move the strap member 21 arcuately with movement of the clutch lever. A spring 26 normally maintains the latch member in engagement with the clutch lever. A release cable 27 is attached to the extremity of the latch and extends to a convenient location such as on the steering column. The release cable is employed to disengage the latch from the clutch lever so as to render the automatic gear shifting mechanism inoperative and permit full manual operation.

The latch member 25 may be journaled on a cross pin 28 which extends through both lever arms 22 and 23.

Attached to the second-high operating lever 10 at points equally spaced from opposite sides of its fulcrum is a pair of operating plates or connecting members 29 and 30. The operating plates extend downwardly and rearwardly from the operating lever 10 and along opposite sides of the arm 23. The plates are provided with arcuate slots 31 through which passes the cross pin 28.

The margins of the plates 29 and 30 adjacent the slots are likewise arcuate. The slots 31 and arcuate margins center at the axis of the shaft 24. The depending extremity of the lever 23 is disposed between the plates 29 and 30 and is provided with aligned bearings 32, traversing the axis of the arm 23, that is, parallel to the plates 29 and 30. The bearings are adapted to receive a rocker or toggle pin 33. Oscillatable on the rocker pin between the bearings 32 is a rocker cam 34, having oppositely extending ears or lugs 35a and 35b which ride under the arcuate extremities of the operating plates 29 and 30. Secured to one end of the rocker pin 33 is a forked arm 36, having a depending forked extremity confronting the rocker cam 34.

A spring 37 is secured to the rocker pin 33 at its end opposite from the arm 36. The spring is provided with an extremity which extends into the slot formed by the forked extremity of the arm 36. The extremity of the spring is capable of vertical movement and is so arranged as to bear against the rocker cam 34 between the latch ears 35a and 35b. The cam is in the form of a depending ogive to provide opposed curved cam surfaces. The spring extremity bears upwardly against one or the other of these surfaces and tends to hold the rocker arm in either of the two extreme portions shown in Figures 7 and 8. However, by reason of the offset arrangement of the slot in the arm 36, the rocker cam normally moves to the position shown in Figure 7 in which position movement of the second-high shifting operating lever to its second position is effected as will be brought out hereinafter. That is, when the rocker cam is in intermediate position shown in Figure 9, it tends, when released, to shift to the position shown in Figure 7.

The arcuate margin of each operating plate includes a notched or recessed arcuate portion 38, the rear extremity of which, terminates in a stop shoulder which is preferably provided with an adjustable stop plate 39. The opposite of forward extremity of each arcuate portion 38 is provided with a sloping cam shoulder 40. Beyond the cam shoulder, there is formed an extended arcuate portion 41. Pivotally connected to each operating plate, forwardly of the cam shoulder 40, is a cam lever 42. Each cam lever extends along the side of its corresponding arcuate portion 41 and projects downwardly or radially outwardly therefrom under urge of a spring 43. The rocker cam 34 is held in an intermediate position with its latch ears 35a and 35b confronting the extended arcuate portion 41 of both operating plates as shown in Figure 9. If, however, the operating plates are arcuately displaced from each other and only one of the latch ears is disposed opposite the extended arcuate portion 41, the corresponding cam lever 42 forces the rocker cam 34 to one or the other of its extreme positions as shown in Figures 7 and 8.

Mounted on the low-reverse operating lever 9 is a dog lever 44, preferably mounted on the low-reverse shifting shaft 9a. The dog lever is provided with an arm which is held in yieldable engagement with a stop pin 45 by a spring 46. The opposite end of the lever 44 forms a dog tooth 47, movable in one direction against the operation of the spring 46 but restrained in its movement in the opposite direction by the stop pin 45.

Mounted on the driving member 21 is an actuating bar 48 so disposed that when the low-reverse operating lever is in its low position and the clutch is moved from its engaged to its disengaged position, the actuating bar bears against the dog tooth 47 and shifts the operating lever 9 to its neutral position. However, when the operating lever 9 is in its reverse gear position, the actuating bar gears the dog lever. Also by reason of the manner in which the dog lever is mounted, the clutch is capable of moving from its engaged position to its disengaged position, from its disengaged position to its engaged position without shifting the low-reverse shaft.

Operation of my automatic gear shifting mechanism, shown in Figures 1–16, is as follows:

Reference is first directed to Figure 4 in which the low-reverse lever is in neutral position, the second-high lever is in neutral position, the clutch is engaged and the automatic mechanism is latched to the clutched lever.

To place the vehicle in gear, the clutch is first disengaged as shown in Figure 10, but the pedal is pushed only to an intermediate position indicated by A in figure 1. As will be brought out hereinafter, this position can be determined by increased instances to movement of the pedal. The low-reverse lever is then manually set in its low gear position as shown in Figure 11. The clutch is then engaged which does not cause further shifting of the low-reverse lever or second-high lever. That is, only the clutch lever and drive member move as shown in Figures 12 and 13. The vehicle is now in low gear.

When it is desired to shift to second gear, the clutch is fully disengaged. That is, the clutch pedal is moved to its extreme position shown by dotted line B in Figure 1. In doing so, the actuating bar 48 first engages the dog lever 44 to shift the low-reverse lever to its neutral position. This of course occurs after the clutch is disengaged and before the clutch pedal is fully depressed. The final movement of the clutch pedal from the position A to the position B of Figure 1, causes the second-high lever to move to its second gear position shown in Figure 14.

This movement is accomplished by the rocker or toggle cam 34 which, as previously pointed out, tends to occupy the position shown in Figure 7. In moving the clutch pedal from the position A to the position B, the left hand latch ear 35a of the toggle or rocker cam 34, as viewed in Figure 7, engages the operating plate 29 and forces this plate rearwardly. As will be observed, this plate is connected to the second-high lever above its fulcrum point so that the lever is rotated clockwise. The clockwise movement of this lever shifts the other operating plate 30 forwardly. When the clutch pedal is released, and the clutch is again engaged, the toggle mechanism rides forwardly on to the cam shoulders but does not change the position of the gear shifting levers. The vehicle is now in second gear.

To shift to high gear, the clutch pedal is again depressed to its position B, disengaging the clutch. By reason of the previous relative positions of the two operating plates 29 and 30, the toggle or rocker cam 34 has been forced to its other extreme position shown in Figure 8 so that if the clutch is disengaged, the opposite latch ear 35b engages the stop shoulder 39 of the plate 30, forcing this plate rearwardly and causing counter clockwise movement of the second-high lever 10 so that the parts are moved from the position shown in Figure 14 to the position shown in Figure 15 and the vehicle is in high gear.

If the clutch pedal is again depressed to its full extent, the toggle or rocker cam is caused to tilt back to its position shown in Figure 7 whereupon the second-high lever is shifted to its second gear position, that is, back to the position shown in Figure 14. Thus, alternate complete depression of the clutch pedal causes the transmission gears to be shifted back and forth between second and high gear.

It will be observed that if the transmission is in high gear, and the clutch pedal is depressed to either position A or to position B, the transmission will shift into second gear. However, if the transmission is in second gear and the pedal is only moved to position A, the clutch may be repeatedly disengaged without shifting the transmission from second gear. This is due to the fact that the rocker or toggle cam is biased by the position of spring 37 as shown in Figures 7, 8 and 9.

Position A can be readily detected in the operation of the clutch pedal by reason of the added resistance encountered by engagement of a latch ear 35a or 35b with the corresponding stop plate 39.

When desiring to place the transmission in neutral, this is done by the steering column or handle lever 3 and in such conditions, the clutch pedal may be moved back and forth between an engaged and disengaged position of the clutch without shifting the transmission gears provided and is not moved beyond position A. If it is moved beyond position A, the effect will be to place the transmission in second gear. If it is desired to place the transmission in low gear, irrespective of the previous position of the transmission, this is done by manual shifting of the handle lever. Such manual shifting, by reason of the conventional mechanism in the transfer box 4, places the second-high lever in its neutral position whenever the low-reverse lever is in its reverse or low position.

In order to eliminate movement of the hand lever 3 by the automatic gear shifting mechanism, a collar 49 may be attached to the control rod 1, connected with a spring 50, anchored to a suitable point behind the dashboard or fire wall of the vehicle. Such bias load or the conventional control rod 1 places it out of engagement with the mechanism within the transfer box 4.

Reference is now directed to Figures 17 through 26. The structure here illustrated is in most respects similar to the first described structure in that most of the elements of the first described structure are retained but are rearranged in a more compact form so that the mechanism may be mounted on the steering column of a vehicle.

Thus with reference to Figure 17, the conventional manual transmission control is shown as including a control rod 51 mounted on a steering column 52 and designed to be both reciprocated and oscillated by a hand lever 53. In this construction, the lower end of the control rod is shown as journaled between the legs of a U-shaped mounting bracket 54, secured to the steering column by straddle bolts 55. Between the legs of the mounting bracket 54, the control rod 51 is provided with a clutch pin 56 which is adapted, on reciprocation of the control rod to slide into key slots provided in adjacently disposed collars 57 and 58. The collar 57 carries a low-reverse lever 59 whereas collar 58 is provided with a second-high lever 60. The levers 59 and 60 are operatively associated with the gears of the transmission by means of connecting rods 61 and 62. The structure so far described may be considered conventional.

Mounted on the bracket 54 is a U-frame 63 having upwardly extending legs between which is mounted a journal pin 64 which journals a low-reverse lever 65 and a second-high lever 66. These levers are disposed in alignment with and above the levers 59 and 60, and are connected therewith by links 67.

The frame 63 is provided with a second journal pin 68 disposed above and to one side of the pin 64. The pin 68 supports a clutch lever 69, one arm of which, is joined to a connecting rod 70 which extends to the clutch operating lever 71 of the vehicle. Also mounted on the journal pin 68 is a sector lever 72 which is secured to the clutch lever 69 so as to oscillate therewith. Pivotally attached to the sector lever 72 is a depending catch lever 73, the back side, of which, bears against a roller 74. The catch lever is urged against the roller 74 by a spring 75. Another spring 76 attached to the clutch lever 69 tends to hold this end of the clutch lever downward and to maintain the catch lever in its lower position. In this position of the catch lever, the clutch is in its engaged position.

Mounted on the journal pin 64 is a dog lever 77. As shown in Figures 21 and 19, the dog lever is so positioned that when the low-reverse lever is in its "low" position, the latch lever engages the dog to tilt the low-reverse lever upwardly into its neutral position. It will be observed that the latch lever may move downwardly past the dog lever. This is made possible by a spring 78 which normally holds the dog lever against a stop 79.

Mounted on the journal pin 68 is a U-lever 80. One leg of the U-lever is adjustably attached to the sector lever 72 so that the relative arcuate portions of these two levers may be altered. The other leg of the U-lever terminates in a bearing 81, substantially tangent to the journal pin 64 and carrying a rocker pin 82. The bearing is divided to receive a rocker cam 83 mounted on the pin 82. The rocker cam 83 is similar to the rocker cam 34 of the first described structure. As in the first described structure, the rocker pin carries a forked arm 84 and a spring 85. The spring 85 extends over the rocker cam 83 and into the forked end of the arm 84. A small roller is mounted on the extremity of the spring 85 so as to bear against the cam 83. The rocker cam is provided with opposed lugs 86 and 87 which bear against segment plates 88 and 89. The segment plates are provided with notched peripheries 90, each terminating at one circumferential extremity in a cam shoulder 91 and in its other extremity in a stop shoulder 92. Except for changes in size and portions, the rocker cam, segment plates and associated elements are essentially the same as shown in the first described structure, and function in an identical manner. The segment plates 88 and 89 are connected by links 93 and 94, respectively, with the second-high lever 66. The links join to this lever at equal points on opposite sides of the journal pin 64. The frame 63 and associate mechanism is enclosed in a cover or shell 95.

The operation of the modified structure shown in Figures 17 through 26 is precisely the same as in the first described structure. That is, the catch lever 73 and the dog lever 77 serve to move the low-reverse lever to neutral position after the gears have been manually set in "low" speed and the clutch pedal is operated. Similarly, the rocker cam operates to move the second-high lever between its two positions with alternate operation of the clutch pedal.

Having fully described my invention, it is to be understood that I do not wish to be limited to the details herein set forth, but my invention is of the full scope of the appended claims.

I claim:

1. The combination with a change speed gear transmission having an oscillatable shaft for moving gears between a primary and a secondary position through a neutral intermediate position, and a clutch lever of an automatic shifting mechanism, involving: a shifting lever for moving said gear shifting shaft between said primary and secondary positions; a pair of connecting members joined to said shifting lever and simultaneously movable in opposition to each other to effect movement of said lever between said primary and secondary positions; an operating arm movable with said clutch lever; a toggle device carried by said operating arm and tiltable to engage either of said connecting members; and cam means carried by each of said connecting members to deflect said toggle device so as to engage said connecting means alternately with alternate movement of said operating arm and clutch lever, thereby to move said shifting lever back and forth between said primary and secondary position.

2. The combination with a change speed gear transmission having an oscillatable shaft for moving gears between a primary and a secondary position through a neutral intermediate position, and a clutch lever of an automatic shifting mechanism, involving: a shifting lever operable to move said transmission gear shifting shaft between its primary and secondary positions through its intermediate neutral position; an arm oscillatable with said clutch lever; a pair of connecting members joined to said shifting lever on opposite sides of its axis to move in opposite directions on movement of said shifting lever; a tiltable selector means, carried by said oscillatable arm and engageable with either of said connecting members; and cam elements on said connecting members to tilt said selector means and cause alternate operation of said connecting members through said oscillatable arm and selector means.

3. The combination with a change speed gear transmission having an oscillatable shaft for moving gears between a primary and a secondary position through a neutral intermediate position, and a clutch lever of an automatic shifting mechanism, involving: a shifting lever operable to move said transmission gear shifting shaft between its primary and secondary positions through its intermediate neutral position; an arm oscillatable with said clutch lever; a pair of connecting members joined to said shifting lever on opposite sides of its axis to move in opposite directions on movement of said shifting lever; a tiltable selector means carried by said oscillatable arm and engageable with either of said connecting members; cam elements on said connecting members operable, on predetermined maximum movement of said clutch lever, to tilt said selector means and cause alternate operation of said connecting members through said oscillatable arm and selector means; and means for applying a biasing load on said selector means, on predetermined minimum movement of said clutch lever, tending to cause said selector means to engage the connecting member which shifts said shifting lever to its primary position.

4. The combination with a change gear transmission having a low-reverse shaft for moving transmission gears between a reverse and low-speed position through a neutral position, a second-high shaft for moving other transmission gears between a second and high-speed position through a neutral position; a manually operated shifting means capable of placing said low-reverse shaft in a low position while simultaneously placing said second-high shaft in neutral position; and a clutch and clutch lever of an automatic gear shifting mechanism, comprising: a drive member movable with said clutch lever; means operable by said drive member, when said transmission gears have been manually set in low position and said clutch has been thereafter disengaged, to shift said low-reverse shaft to a neutral position as said clutch lever is moved to effect reengagement of said clutch; means simultaneously operable by said member to shift said second-high shaft to its second gear operating position; and further means operable by said drive member on subsequent disengagement of said clutch as said clutch lever moves to reengage said clutch to shift said second-high shaft to its high gear position.

5. An automatic gear shifting mechanism as set forth in claim 4 wherein: said second-high gear shaft operating means include connecting members connected with said shaft on opposite sides of its axes for movement in opposite directions, and cam and toggle means connect said members with said drive member, said toggle and cam means being operable to shift said second-high gear shaft back and forth between second and high gear positions upon alternate operations of said clutch lever.

6. An automatic gear shifting mechanism as set forth in claim 4 wherein: said means operatively connecting said drive member with said low-reverse shaft including a catch lever operable to move said shaft from its low gear to its neutral position but inoperable on opposite movement, and a catch engaging device on said drive member positioned to clear said catch lever when said shaft is in its reverse gear position, and movable past said catch lever as said clutch is disengaged without operation of said shaft, but engageable with said catch lever when said drive member is moved subsequently toward a clutch engaging position thereby to move said shaft to its neutral position.

7. An automatic gear shifting mechanism as set forth in claim 4 wherein: said means operatively connecting said drive member with said low-reverse shaft including a catch lever operable to move said shaft from its low gear to its neutral position but inoperable on opposite movement, and a catch engaging device on said drive member positioned to clear said catch lever when said shaft is in its reverse gear position, and movable past said catch lever as said clutch is disengaged without operation of said shaft, but engageable with said catch lever when said drive member is moved subsequently toward a clutch engaging position thereby to move said shaft to its neutral position; said second-high gear shaft operating means including connecting members connected with said shaft on opposite sides of its axes for movement in opposite directions, and cam and toggle means connecting said members with said drive member, said toggle and cam means being operable to shift said second-high gear shaft back and forth between second and high gear positions upon alternate operations of said clutch lever.

8. The combination with a change gear transmission having a second-high shaft for moving transmission gears between a second and high speed position through a neutral position; and a clutch and clutch lever, of an automatic gear shifting mechanism, comprising: a drive member movable with said clutch lever; an over-center drive element carried by said drive member and having a primary and secondary position; a pair of connecting members so associated with said second-high shaft as to move in opposite directions on movement of said shaft; catch means on each connecting member engageable by said drive element, said drive element engageable with the catch means of one connecting member when said drive element is in its primary position and with the catch means of the other of said connecting members when said drive element is in its secondary position, and cam means on said connecting members operable on a full movement of said drive member to shift said over-center drive elements between its primary and secondary positions thereby to effect shifting of said second-high shaft between its second gear position and high gear position with alternate movement of said clutch lever.

9. An automatic gear shifting mechanism as set forth in claim 8 wherein: said over-center drive element is so biased and said cam means are so disposed that on movement of said clutch lever and drive member to a predetermined intermediate position in which said clutch is disengaged, said second-high shaft moves to a neutral position, and on subsequent movement of said clutch lever and drive member to reengage said clutch, said shaft is moved to its second speed position.

10. The combination with a change gear transmission having a low-reverse shaft for moving transmission gears between a reverse and low-speed position through a neutral position, a second-high shaft for moving other transmission gears between a second and high-speed position through a neutral position; a manually operated shifting means capable of placing said low-reverse shaft in a low position while simultaneously placing said second-high shaft in neutral position; and a clutch and clutch lever of an automatic gear shifting mechanism, comprising: a drive member movable with said clutch lever; means operable by said drive member, when said transmission gears have been manually set in low position and said clutch has been thereafter disengaged, to shift said low-reverse shaft to a neutral position as said clutch lever is moved to effect re-engagement of said clutch; an over-center drive element carried by said drive member and having a primary and secondary position; a pair of connecting members so associated with said second-high shaft as to move in opposite directions on movement of said shaft; catch means on each connecting member engageable by said drive element, said drive element engageable with the catch means of one connecting member when in its primary position and with the catch means of the other of said connecting members when in its secondary position, and cam means on said connecting members operable on a full movement of said drive member to shift said over-center drive elements between its primary and secondary positions thereby to effect shifting of said second-high shaft between its second gear position and high gear position with alternate movement of said clutch lever.

11. An automatic gear shifting mechanism as set forth in claim 10 wherein: said over-center drive element is so biased and said cam means are so disposed that on movement of said clutch lever and drive member to a predetermined intermediate position in which said clutch is disengaged, said second-high shaft moves to a neutral position, and on subsequent movement of said clutch lever and drive member to re-engage said clutch, said shaft is moved to its second speed position.

12. An automatic gear shifting mechanism as set forth in claim 10 wherein: said means operatively connecting said drive member with said low-reverse shaft including a catch lever operable to move said shaft from its low gear to its neutral position but inoperable on opposite movement, and a catch engaging drive on said drive member positioned to clear said catch lever when said shaft is in its reverse gear position, and movable past said catch lever as said clutch is disengaged without operation of said shaft, but engageable with said catch lever when said drive member is moved subsequently toward a clutch engaging position thereby to move said shaft to its neutral position.

13. An automatic gear shifting mechanism as set forth in claim 10 wherein: said means operatively connecting said drive member with said low-reverse shaft including a catch lever operable to move said shaft from its low gear to its neutral position but inoperable on opposite movement, and a catch engaging device on said drive member positioned to clear said catch lever when said shaft is in its reverse gear position, and movable past said catch lever as said clutch is disengaged without operation of said shaft, but engageable with said catch lever when said drive member is moved subsequently toward a clutch engaging position thereby to move said shaft to its neutral position; and wherein: said over-center drive element is so biased and said cam means are so disposed that on movement of said clutch lever and drive member to a predetermined intermediate position in which said clutch is disengaged, said second-high shaft moves to a neutral position, and on subsequent movement of said clutch lever and drive member to reengage said clutch, said shaft is moved to its second speed position.

SELMER L. WIIG.

References Cited in the file of this patent

UNITED STATES PATENTS

| Number | Name | Date |
|---|---|---|
| 1,450,745 | Leece | Apr. 3, 1923 |
| 1,773,216 | Campbell | Aug. 9, 1930 |
| 1,969,416 | Leece | Aug. 7, 1934 |
| 2,079,529 | Richardson | May 4, 1937 |
| 2,208,828 | Adams | July 23, 1940 |
| 2,293,758 | Pescara | Aug. 25, 1942 |
| 2,554,312 | Price | May 22, 1951 |